A. SCHALKAU.
APPARATUS FOR DRIVING ELECTRICAL MACHINES.
APPLICATION FILED MAR. 5, 1912.
1,160,771.
Patented Nov. 16, 1915.
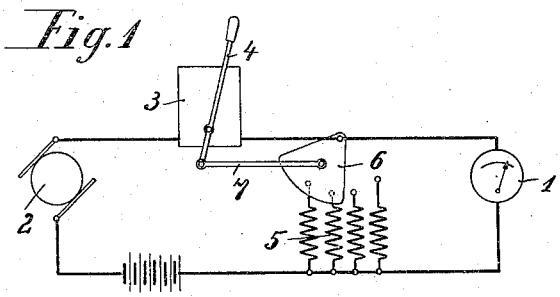
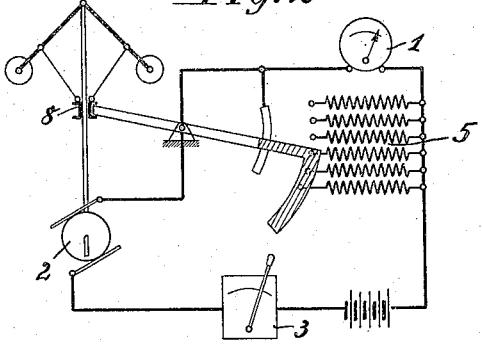
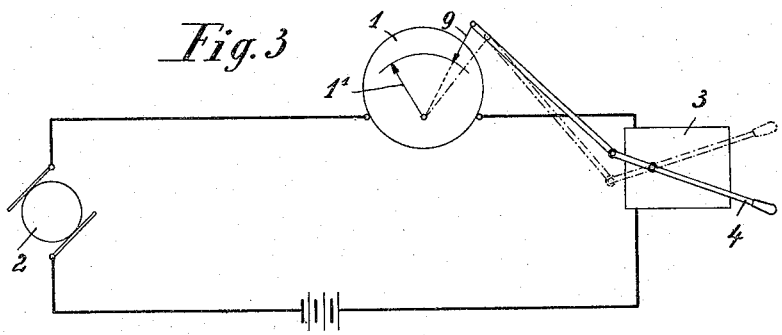

UNITED STATES PATENT OFFICE.

ARTHUR SCHALKAU, OF SCHÖNEBERG, NEAR BERLIN, GERMANY, ASSIGNOR TO SIEMENS-SCHUCKERT WERKE, G. M. B. H., OF BERLIN, GERMANY, A CORPORATION OF GERMANY.

APPARATUS FOR DRIVING ELECTRICAL MACHINES.

1,160,771.      Specification of Letters Patent.      Patented Nov. 16, 1915.

Application filed March 5, 1912. Serial No. 681,771.

*To all whom it may concern:*

Be it known that I, ARTHUR SCHALKAU, a citizen of the Empire of Germany, and residing at Schöneberg, near Berlin, Germany, have invented certain new and useful Improvements in Apparatus for Driving Electrical Machines, of which the following is a specification.

My invention relates to apparatus for driving electrical machines.

A co-pending application Serial No. 539829, filed January 24, 1910, by Georg Meyer and Alexander Kühns, filed January 24th, 1910, Ser. No. 539,829 discloses a process which by employing safety devices admits of the full load-capacity of a dynamo electric machine being utilized at all speeds. This is effected either by cutting into circuit a smaller or larger number of safety members, or by varying the sensitiveness of maximum circuit-breakers in dependence on either the speed of the motor for the time being or the voltage.

The aforementioned application for patent relates to a method of operating electrical machines, which permits to load the same always with the highest permissible current. With a continuous current motor, for instance, the current may be larger within the range of smaller speeds than within the range of higher speeds and even larger than the maximum current for which the usual safety cut-outs are adjusted. This adjustment according to ordinary practice is made to suit the most dangerous current strength in the most unfavorable case, said current strength being always smaller than that permissible at low speeds. According to this method the safety cut-out in order to attain a maximum utilization of the machine is automatically adjusted upon the load capacity, that is to say, at small speeds it is adjusted upon a large current value and at greater speeds upon smaller current values. The adjustment is done in dependence from the speed, from the speed adjusting device or from the voltage, and more particularly by switching on or off parallelly connected fuses or by varying the sensitiveness of maximum current switches. In this manner, for instance a rolling mill motor, which at the start of the rolling process is driving the material to be rolled at slow speed but under high pressure through the rolls, can take up an accordingly large current and may thus be fully utilized. In order to attain such favorable utilization, the machine must at the same time be so controlled that it will take up the permissible greater current, if at diminishing speed or voltage the load capacity increases; similarly the machine must be controlled in backward direction, if the load capacity again decreases. Accordingly, the engineer who controls a motor protected in this manner has to drive in such manner while simultaneously observing a speed indicator and a current indicator that at each speed an exactly predetermined strength of current is not exceeded if he does not wish to cause the safety devices to operate prematurely. His task is the more difficult the more the strength of current varies with the speed, and the quicker the cycle of operations takes place. When driving roll-trains, for example, the passes follow one another so rapidly, and the engineer has to pay attention to so many details as it is, that the described simultaneous observation of current and speed would be too great a strain on him.

Now a primary object of my invention is to facilitate the work of the engineer by putting him into the position of controlling the motor according to an instrument which by means of a predetermined maximum deflection corresponding at all times to the momentary load-capacity of the motor indicates whether he is fully utilizing the machine. I attain this end by employing an indicating device, *e. g.* an optical or acoustic signal, or a measuring instrument, which always gives the same deflection with various strengths of current as long as the motor runs at the speed admissible at the strength of current in question. The measuring instrument may suitably be so arranged that its deflections are not proportional to the strength of current, but so that it possesses relatively to the various strengths of current a variable "constant" which is dependent on the speed of the motor or on the voltage in exactly the same manner as the sensitiveness of the safety devices in the above-mentioned co-pending application. This can be done by providing the current indicator with a variable shunt whose resistance is influenced by the deflection of the steering lever or by a governor, or the resistance of the instrument-circuit itself may vary in dependence on the steering lever or governor. It is still simpler to provide the measuring instrument with two pointers, of which the one, for example, indicates the strength of current in the customary manner, while the second is formed as an adjustable index which is movable along the scale of the current indicator and by its position dependent on the speed of the motor indicates at every moment to the engineer the maximum current he can send through the motor. The motor is then fully utilized at every moment corresponding to its variable load-capacity when the position of the current indicator coincides with that of the movable speed index.

Several illustrative embodiments of my invention are represented by way of example in the accompanying drawing, wherein:—

Figure 1 is a diagram showing one form of apparatus according to my invention, Fig. 2 is a like view showing another form, and Fig. 3 is a like view showing a third form.

Similar reference letters designate like parts in all views.

Referring firstly to Fig. 1, the measuring instrument or current indicator 1 is connected in the circuit of the motor 2 and its controller 3 having a lever 4. Now I provide the current indicator with a variable shunt resistance 5 which can be varied by means of a contact piece 6 through the medium of a connecting-rod 7 by the lever 4 of the controller.

In the form shown in Fig. 2 the resistance 5 is varied through the medium of a governor 8 driven by the motor 2 directly in dependence on the speed of the motor.

The simplest form of my apparatus shown in Fig. 3 comprises a measuring instrument 1 provided with a second index 9 which is pivotally connected with the controller-lever 4 and is movable along the same scale as the customary index 1' of the current indicator.

The indicating device may be modified in various ways without departing from the scope of the invention. Common to all such modifications will be the fact that a predetermined deflection of the measuring instrument will indicate at any time whether the motor is fully utilized at each speed in the sense of the above-mentioned co-pending application corresponding to its load-capacity for the time being.

I claim:—

1. The combination, with an electric circuit comprising a dynamo-electric machine and a controller for controlling said machine, of a current indicator connected in said circuit, and means for varying the readings of the current indicator in dependence on the load-capacity of the machine.

2. The combination, with an electric circuit comprising an electric motor and a controller for controlling the motor, of a current indicator connected in said circuit, and means actuated in dependence on the current traversing the armature of the motor for varying the readings of the current indicator in dependence on the load-capacity of the motor.

3. The combination, with an electric circuit comprising an electric motor and a controller for controlling the motor, of a current indicator connected in said circuit, and means actuated in dependence on both the speed of the motor and on the current traversing the armature of the motor for varying the readings of the current indicator in dependence on the load-capacity of the motor.

4. The combination, with an electric circuit comprising an electric motor and a controller for controlling the motor, of a current indicator connected in said circuit, and means connected with the controller-lever for varying the readings of the current indicator in dependence on the load-capacity of the motor.

5. The combination, with an electric circuit comprising an electric motor and a controller for controlling the motor, of a current indicator having a scale and an index movable in operative relation thereto connected in said circuit, of a second index movable in operative relation to said scale and operatively connected to the controller-lever.

In testimony whereof, I have signed by name to this specification in the presence of two witnesses.

ARTHUR SCHALKAU.

Witnesses:
 WOLDEMAR HAUPT,
 HENRY HASPER.